United States Patent
Takahashi et al.

[11] Patent Number: 6,013,363
[45] Date of Patent: Jan. 11, 2000

[54] PACKAGING MATERIAL

[75] Inventors: Isao Takahashi; Junichi Yasuda; Mitsuru Matsuyama, all of Tokyo, Japan

[73] Assignee: Oji-Yuka Synthetic Paper Co., Ltd., Tokyo, Japan

[21] Appl. No.: 09/042,617

[22] Filed: Mar. 17, 1998

[30] Foreign Application Priority Data

Mar. 17, 1997 [JP] Japan ................................. 9-062970

[51] Int. Cl.[7] ................. B32B 3/26; B32B 7/12; B32B 31/14; B65D 73/00
[52] U.S. Cl. ............ 428/315.9; 156/277; 156/299; 206/484.1; 206/484.2; 428/35.2; 428/213; 428/315.7; 428/317.3; 428/319.1; 428/347; 428/354
[58] Field of Search ................. 428/35.2, 213, 428/315.7, 315.9, 317.3, 319.1, 347, 354; 156/277, 299; 206/484.1, 484.2

[56] References Cited

U.S. PATENT DOCUMENTS

| | | | |
|---|---|---|---|
| 5,314,561 | 5/1994 | Komiya | 156/244.11 |
| 5,491,018 | 2/1996 | Maro et al. | 428/200 |
| 5,756,171 | 5/1998 | Moteki et al. | 428/36.6 |
| 5,770,301 | 6/1998 | Murai et al. | 428/213 |

*Primary Examiner*—Blaine Copenheaver
*Attorney, Agent, or Firm*—Oblon, Spivak, McClelland, Maier & Neustadt, P.C.

[57] ABSTRACT

A laminate which contains the following layers:

(I) a stretched microporous resin film base layer having an opacity of at least 80%;

(Ia) a heat sealable adhesive resin layer on the back side of the base layer;

(II) a gas barrier resin film layer on the surface side of the base layer; and (III) an inorganic oxide thin film layer on the surface side of the gas barrier resin film layer, wherein the laminate:

(i) has a water vapor permeability of at most 5 $g/m^2 \cdot 24$ hr, and (ii) has an oxygen permeability of at most 5 $cc/m^2 \cdot 24$ hr·atm.

The laminate is useful, for example, for packaging a variety of articles, e.g., edible products, in which taste and freshness are desirably preserved during transportation and storage thereof.

26 Claims, 2 Drawing Sheets

PACKAGING MATERIAL

FIELD OF THE INVENTION

The present invention relates to a packaging material suitable for packaging powdery materials such as tea, bath salts, coffee beans, drugs, agricultural chemicals, candies and fertilizers, and liquids such as sake and fruit juice.

BACKGROUND OF THE INVENTION

The packaging of the above-mentioned powdery materials and liquids requires the prevention of water vapor or oxygen transmission and the prevention of visible light ray transmission. In general, (1) a translucent packaging material formed of a laminate comprising wax-coated printed paper, aluminum foil provided on the back thereof, and a heat sealable layer such as an ethylene-acrylic acid copolymer or an ethylene-vinyl acetate copolymer provided on the back of the aluminum foil, or (2) a translucent packaging material formed of a laminate comprising a biaxially stretched polyethylene terephthalate film/an adhesive polyethylene film layer/aluminum foil/a biaxially stretched polypropylene film/a heat sealable polyethylene film has been used in the form of a carton box or a flexible packaging bag.

In general, the packaging bags for the above-mentioned powdery materials are first filled with contents such as tea, coffee beans and drugs, and then inspected to determine whether or not the contents are contaminated with foreign materials such as metal powders. Thereafter, opened portions of the bags are heat sealed, followed by shipment or storage.

However, the inspection with the bags opened results in giving an opportunity to contaminate the contents with dust and foreign materials. The market has therefore desired packaging materials which can be inspected for the inclusion of metal powders in contents after filling and heat sealing of the opened portions.

Further, the conventional packaging materials have the disadvantage that aluminum foil is left unburned after burning of the packaging materials, resulting in troublesome treatment thereof.

SUMMARY OF THE INVENTION

It is therefore an object of the present invention to provide a packaging material which can be inspected for the metal inclusion after filling and heat sealing of an opened portion, and can be completely burned or recycled after use.

According to a first aspect of the present invention, there is provided a packaging material formed of a laminate comprising a stretched microporous resin film base layer (I) having an opacity (JIS P-8138) of 80% or more, a heat sealable adhesive resin layer (Ia) provided on a back side thereof, a gas barrier resin film layer (II) provided on a surface side of the base layer (I), and a silicon oxide thin film layer (III) provided on a surface of the gas barrier resin film layer (II), where the laminate satisfies the following requirements (i) and (ii):

(i) the laminate has a water vapor permeability (JIS Z-0208) of 5 g/m$^2$·24 hr or less, preferably 2 g/m$^2$·24 hr or less; and (ii) the laminate has an oxygen permeability (JIS Z-1707) of 5 cc/m$^2$·24 hr·atm or less, preferably 2 cc/m$^2$·24 hr·atm or less.

A second aspect of the present invention provides a packaging material formed of a laminate comprising a stretched microporous resin film base layer (I) having an opacity (JIS P-8138) of 80% or more, to a surface side of which a print (P) is given, an inorganic oxide thin film layer (III) provided on a back side thereof, a gas barrier resin film layer (II) provided on the inorganic oxide thin film layer (III), and a heat sealable adhesive resin layer (IV) provided on the gas barrier resin film layer (II) on the side opposite to the printed face of said base layer (I), where the laminate satisfies the above-mentioned requirements (i) and (ii).

DETAILED DESCRIPTION OF THE INVENTION

Figure 1:
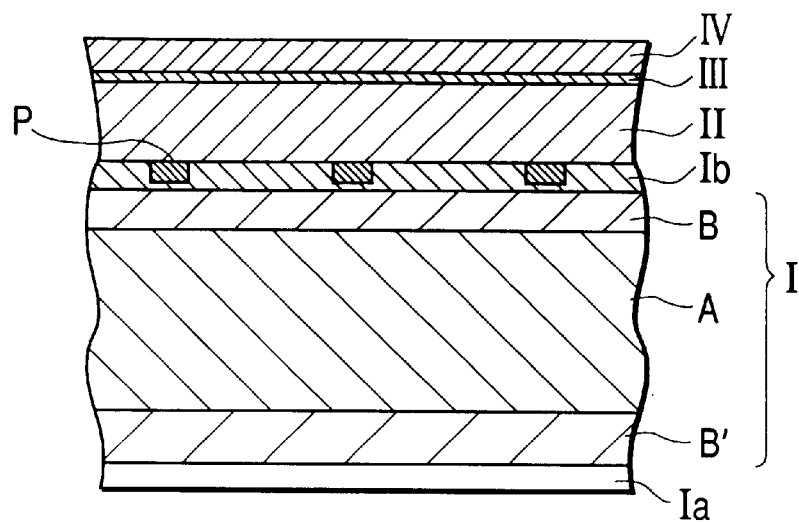
FIG. 1 is an enlarged cross sectional view showing a packaging material embodying the first aspect of the present invention.
Figure 2:
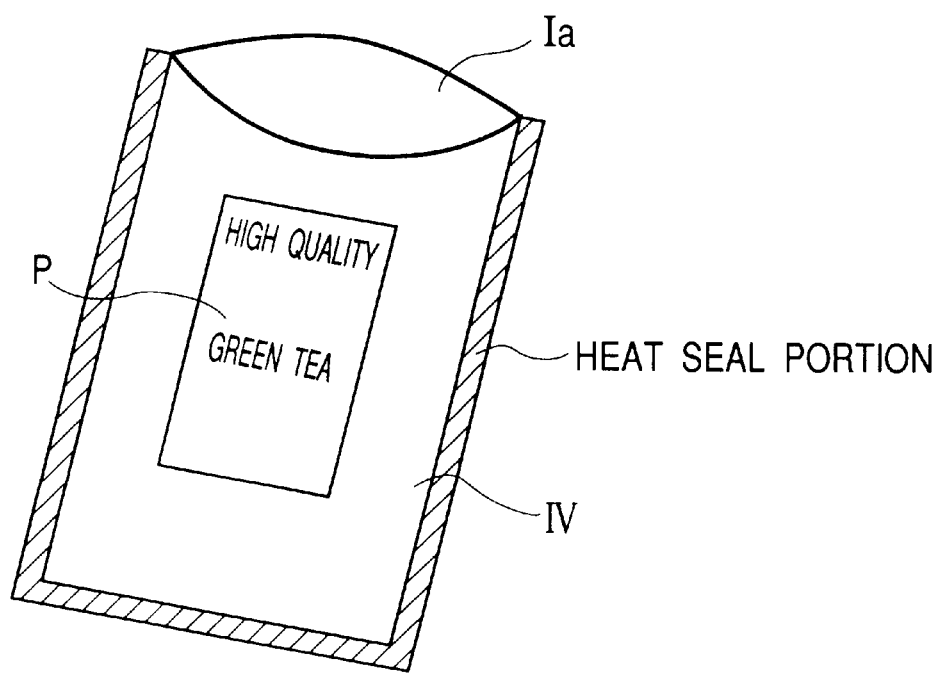
FIG. 2 is a perspective view a packaging bag for tea using the packaging material of FIG. 1.
Figure 3:
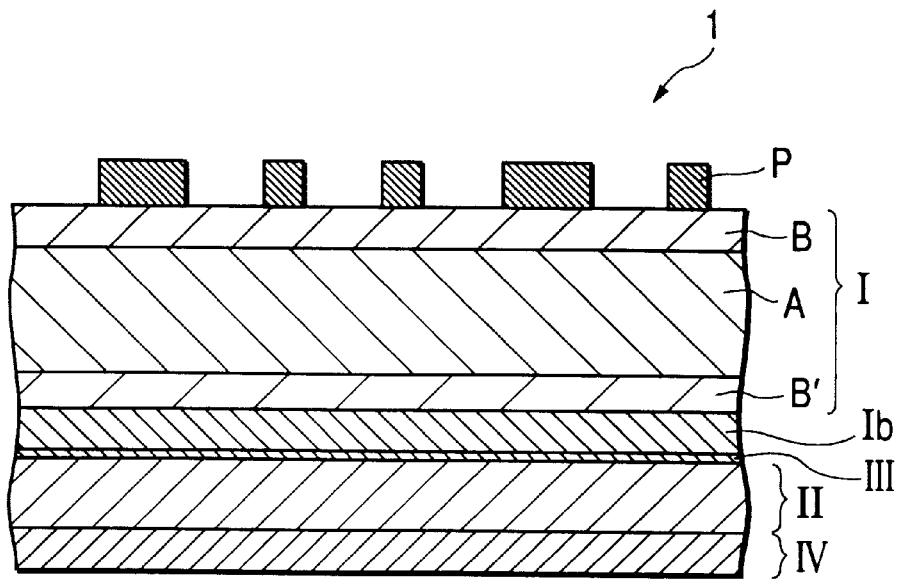
FIG. 3 is an enlarged cross sectional view showing a packaging material embodying the second aspect of the present invention.
Figure 4:
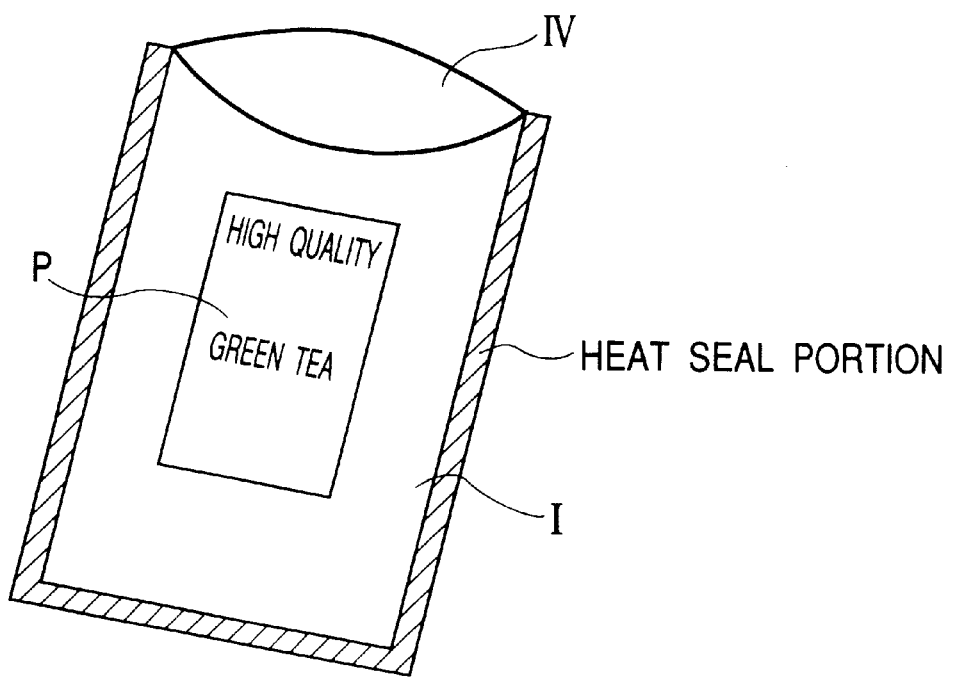
FIG. 4 is a perspective view a packaging bag for tea using the packaging material of FIG. 3.

Referring to the figures, the reference character I designates a stretched microporous resin film base layer, the reference character Ia designates a heat sealable adhesive resin layer, the reference character Ib designates an adhesive layer provided if necessary, the reference character II designates a gas barrier resin film layer, the reference character III designates an inorganic oxide thin film layer, the reference character IV designates a heat sealable adhesive resin layer, and the reference character P designates a print.

Stretched Microporous Resin Film Base Layer (I):

The stretched microporous resin film base layer (I) contributes to giving stiffness to the packaging material, rendering the packaging material opaque to make it easy to identify the print, and lowering the light transmittance, and has an opacity (JIS P-8138) of 80% or more, preferably from 85% to 100%, inclusive of all specific values and subranges between 80% and 100%. As noted above, the opacity of base layer (I) refers to the opacity as determined by JIS P-8138.

Examples of such stretched microporous resin film base layers include (1) to (3) given below.

(1) Biaxially stretched microporous thermoplastic resin films containing 8% to 65% by weight, inclusive of all specific values and subranges therebetween, of inorganic or organic fillers (JP-B-54-31032 (the term "JP-B" as used herein means an "examined Japanese patent publication") and U.S. Pat. Nos. 3,775,521, 4,191,719, 4,377,616 and 4,560,614).

(2) Synthetic paper comprising a uniaxially or biaxially stretched thermoplastic film containing 0% to 40%, including all specific values and subranges therebetween, by weight of a fine white inorganic powder, as a core layer, and a uniaxially stretched thermoplastic film or films provided on one side or both sides of this core layer containing 10% to 65% by weight, including all specific values and subranges therebetween, of a fine white inorganic powder, as a paper-like layer or layers (JP-B-46-40794, JP-A-57-149363 (the term "JP-A" as used herein means an "unexamined published Japanese patent application") and JP-A-57-181829).

This synthetic paper may have a two-layer structure, a three-layer structure in which the uniaxially stretched films are laminated on both sides of the core layer (JP-B-46-40794 and U.S. Pat. No. 4,318,950), or a three- to seven-layer structure in which one or more different resin film layers are interposed between the paper-like layer and the core layer (JP-B-50-29738, JP-A-57-149363, JP-A-56-126155, JP-A-57-181829 and U.S. Pat. No. 4,472,227).

Further, at least one heat sealable layer (Ia) composed of a resin having a lower melting point than the resin of the base layer (I), such as a propylene-ethylene copolymer, a metal (for example, Na, Li, Zn or K) salt of an ethylene-(meth)acrylic acid copolymer or a chlorinated polyethylene, is provided on the back of the synthetic paper to form synthetic paper of at least three layers (JP-B-3-13973).

The synthetic paper having the three-layer structure is produced, for example, by laminating uniaxially stretched films each containing 8% to 65% by weight, including all specific values and subranges therebetween, of a fine inorganic powder on both sides of a thermoplastic resin film containing 0% to 40% by weight, including all specific values and subranges therebetween, preferably 8% to 25% by weight of a fine inorganic powder, said uniaxially stretched films being obtained by uniaxially stretching molten thermoplastic resin films at a temperature lower than the melting point of said resin, and then stretching the resulting laminated film in a direction perpendicular to the above-mentioned direction. The synthetic paper thus obtained is a laminate composed of the biaxially stretched core layer sandwiched between the paper-like layers uniaxially stretched and having many microvoids therein.

The synthetic paper having the three-layer structure is also produced, for example, by laminating resin compositions each containing 8% to 65% by weight, including all specific values and subranges therebetween, of a fine inorganic powder on both sides of a core layer of a resin composition containing 0% to 40% by weight, including all specific values and subranges therebetween, preferably 8% to 25% by weight of a fine inorganic powder, coextruding the laminate, and then stretching the resulting laminated film. The synthetic paper thus obtained is a uniaxially stretched laminate having many microvoids therein.

(3) Printable synthetic paper having high gloss produced by further providing a transparent thermoplastic resin laminate layer on the paper-like layer side of the synthetic paper of the above (2), said laminate layer having a thickness of from 0.1 μm to 20 μm, including all specific values and subranges therebetween, and containing no fine inorganic powder (JP-B-4-60437, JP-B-1-60411, JP-A-61-3748 and U.S. Pat. No. 4,663,216), for example, synthetic paper comprising a multilayered support film composed of a biaxially stretched thermoplastic resin film as a core layer and surface and back layers each comprising a uniaxially stretched thermoplastic resin film containing 8% to 65% by weight, including all specific values and subranges therebetween, of a fine inorganic powder, a transparent thermoplastic resin film layer containing no fine inorganic powder provided on the surface layer side of support, and further a primer coat layer having an antistatic function (JP-A-61-3748), or synthetic paper composed of a multilayered resin film comprising a biaxially stretched thermoplastic resin film as a core layer, and a laminate of a paper-like layer composed of a uniaxially stretched thermoplastic resin film containing 8% to 65% by weight, including all specific values and subranges therebetween, of a fine inorganic powder with a surface layer composed of a uniaxially stretched thermoplastic resin film, said laminate being provided on at least one side of the core layer. The thickness (t) of the above-mentioned surface layer and the average particle size (R) of the fine inorganic powder in the paper-like layer satisfy the following equation (1) (JP-B-1-60411).

$$R \geq t \geq 1/10 \times R \qquad (1)$$

Like the synthetic paper of (2), the synthetic paper of (3) having the multilayer structure may also have a heat sealable resin layer (Ia) on the back thereof.

The stretched microporous resin film is microporous synthetic paper formed of a stretched resin film having microvoids therein. Examples thereof include microporous synthetic paper having an opacity (JIS P-8138) of 80% or more, preferably 85% or more, a void volume of from 10% to 60%, preferably from 15% to 45%, as calculated according to the following equation (2), and a thickness of form 30 μm to 300 μm, preferably from 50 μm to 150 μm.

$$\text{Void volume}(\%) = (\rho_0 - \rho)/\rho_0 \times 100 \qquad (2)$$

$\rho_0$: density of an unstretched resin film $\rho$: density of a stretched resin film Examples of the thermoplastic resins used as materials for the synthetic paper include polyolefin resins such as high-density polyethylene, polypropylene and poly(4-methylpentene-1), polyamides, polyethylene terephthalate, polybutylene terephthalate and mixtures thereof. Of these, high-density polyethylene and polypropylene are preferred from the standpoint of water resistance and chemical resistance. When polypropylene is used for a core layer, it is preferred to incorporate therein 3% to 25% by weight of a thermoplastic resin having a lower melting point than polypropylene, such as polyethylene, polystyrene or an ethylene-vinyl acetate copolymer, in order to improve stretching ability.

Further, as the fine inorganic powders, powders having a particle size of from 0.03 μm to 7 μm are used. Examples thereof include calcium carbonate, calcinated clay, silica, diatomaceous earth, talc, titanium oxide and barium sulfate. The stretch ratio is preferably from 4 to 10 times in each of the machine and transverse directions. The stretching temperature is from 134° C. to 162° C. for a propylene homopolymer (melting point: 164° C.–167° C.), from 110° C. to 120° C. for high-density polyethylene (melting point: 123° C.–134° C.), and from 104° C. to 120° C. for polyethylene terephthalate (melting point: 246° C.–252° C.). The stretching speed is from 50 m/minute to 350 m/minute, including all specific values and subranges therebetween.

The thickness of the stretched microporous resin film base layers (I) is from 30 μm to 300 μm, and preferably from 40 μm to 100 μm. These ranges include all specific values and subranges therebetween.

Heat Sealable Resin Adhesive Layers (Ia) and (IV):

The heat sealable resin adhesive layers contribute to melt adhesion by heating when the packaging materials are processed into bags or carton boxes.

As such thermosensible adhesive resins, resins having a melting point of from 60° C. to 135° C. are used. Examples thereof include ethylene-acrylic acid copolymers, ethylene-vinyl acetate copolymers, low-density polyethylene, metal salts of ethylene-(meth)acrylic acid copolymers (so-called SURLYN), chlorinated polyethylene and chlorinated polypropylene.

The stretched microporous resin film (I) may be laminated with the heat sealable resin film layer (Ia) simultaneously with the production of the film (I), or may be laminated with the heat sealable resin film layer (Ia) by extrusion on the back of the film (I). Further, the stretched microporous resin film (I) may be coated on the back thereof with a resin solution in which the heat sealable resin (Ia) is dissolved or dispersed in an organic solvent such as toluene, xylene or tetralin, followed by drying.

When the gloss is given to the surface of the packaging material or the packaging material is used for a carton box, it is preferred that the heat sealable resin layer (IV) is provided on the surface of the inorganic oxide thin film layer (III).

The thickness of the heat sealable resin adhesive layers (Ia) and (IV) is from 1 μm to 50 μm, and preferably from 2 μm to 40 μm. These ranges include all specific values and subranges therebetween.

Gas Barrier Resin Film Layer (II):

The gas barrier resins used herein have a water vapor permeability (JIS Z-0208) of 100 g/m$^2$·24 hr or less, preferably 50 g/m$^2$·24 hr or less, and an oxygen permeability (JIS Z-1707) of 300 cc/m$^2$·24 hr·atm or less, preferably 200 cc/m$^2$·24 hr·atm or less. Examples thereof include saturated polyesters such as polyethylene terephthalate, polyethylene-2,6-naphthalate, polyamides such as nylon 6, nylon 12 and nylon 66, aromatic polycarbonates, polyvinylidene chloride and ethylene-vinyl alcohol copolymers. As noted above, the water vapor permeability and the oxygen permeability refer to these values as measured by JIS Z-0208 and JIS Z-1707 respectively.

The gas barrier resin film layers may be either stretched or unstretched.

The thickness of the gas barrier resin film layers (II) is from 6 μm to 40 μm, and preferably from 8 μm to 20 μm. These ranges include all specific values and subranges therebetween.

Inorganic Oxide Thin Film Layer (III):

In order to improve the gas barrier properties of the packaging material, the inorganic oxide thin film layer (III) is provided on the surface of the gas barrier resin film layer (II).

The inorganic oxide thin films used herein have a thickness of from 5 nm to 600 nm, preferably from 20 nm to 500 nm, and include amorphous $Al_2O_3$, $SiO_x$, $SnO_x$, $ZnO_x$ and $IrO_x$ (wherein x is 1 or 2). These thickness ranges include all specific values and subranges therebetween.

Less than 5 nm leads to insufficient gas barrier properties, whereas exceeding 600 nm results in poor transparency and liability to develop cracks and separation in the inorganic oxide thin films themselves.

As the inorganic oxide thin films, transparent films having a light transmittance of 75% or more are preferred.

The thickness of the deposited films is restricted to 5 nm to 600 nm from the viewpoints of transparency, deposition speed, gas barrier properties and windability of the films.

Methods for depositing the inorganic oxides on the gas barrier resin film layers (II) include a method for depositing an inorganic oxide on a shaped article under vacuum (from $1 \times 10^{-6}$ Torr to $1 \times 10^{-3}$ Torr) in a depositing apparatus of the high frequency induction heating system (see JP-B-53-12953 and JP-A-62-101428); and a method for depositing $SiO_x$ on a shaped article in a depositing apparatus by preliminarily evacuating the apparatus and exposing a gas stream comprising an evaporated organic silicon compound, oxygen and an inert gas to the magnetron glow discharge under vacuum in the depositing apparatus to generate plasma (JP-A-64-87772 and U.S Pat. Nos. 4,557,946 and 4,599,678).

The depositing methods are classified as ion plating, high frequency plasma CVD, electron beam (EB) deposition and spattering, and the principle thereof is introduced in *Kogyo Zairvo (Industrial Materials)*, 38 (14), 104–105 (November, 1990).

Of these inorganic oxides, silicon oxides and amorphous aluminum oxides are preferred in terms of transparency and processability, and silicon oxides are more preferred in terms of gas barrier properties.

The crystallinity and amorphousness of aluminum oxides described above can be easily measured with a conventional X-ray diffractometer using the Kα line of Cu. For example, when crystalline α-$Al_2O_3$ is contained, clear diffraction peaks appear at positions corresponding to angles of diffraction (2θ) of 43.39 degrees and 57.56 degrees. In the case of β-$Al_2O_3$, diffraction peaks appear at positions corresponding to angles of diffraction (2θ) of 66.65 degrees and 33.43 degrees. From the half band width of these diffraction peaks, the particle size of crystals can also be measured. Besides, for other crystalline aluminum oxides such as γ-$Al_2O_3$ and δ-$Al_2O_3$, inherent diffraction peaks can also be similarly measured. In the case of amorphous aluminum oxides, no specific diffraction peaks are measured with an X-ray diffractometer. The term "amorphous aluminum oxides" used herein means aluminum oxides in which no specific diffraction peaks are observed by X-ray diffraction.

When the adhesion of the gas barrier resin film layers (II) to the inorganic oxide thin films (III) is insufficient according to the kind of the film layers (II), primers (adhesives) can be applied between the gas barrier resin film layers (II) and the inorganic oxide thin films (III).

Examples of such primers include polyurethane primers such as polyesterpolyol-polyisocyanates and polyetherpolyol-polyisocyanates.

The primers are generally applied in an amount of from 0.5 g/m$^2$ to 5 g/m$^2$ (on a solid basis).

Further, for making it easy to adhere the gas barrier resin film layers (II) having the inorganic oxide thin film layers (III) to the base layers (I), the inorganic oxide thin film layers (III) may be covered with the heat sealable resin adhesive layers (Ib).

In the formation of transparent plastic films on the inorganic oxide thin films, they are laminated with various transparent plastic films, or transparent plastic coating films are formed thereon. Resins which can be used in the formation of the transparent plastic films include polyethylene and ethylene copolymers, polypropylene and propylene copolymers, ethylene-vinyl acetate copolymers, ionomers, vinyl chloride resins such as polyvinyl chloride and copolymers thereof, vinylidene chloride resins such as vinylidene chloride-vinyl chloride copolymers, and polyester resins such as polyethylene terephthalate.

The gas barrier resin film (II) may be adhered to the stretched microporous resin film base layer (I) by co-extruding a resin for the gas barrier resin film (II) and a filler-containing resin for the base layer (I) in producing the base layer (I), followed by stretching to produce a laminate of the base layer (I) with the gas barrier resin film (II), or by using the above-mentioned primer (Ib). As such a primer (Ib), for example, a polyurethane primer is available as EL-150 (trade name) or a mixture of BLS-2080A and BLS-2080B, each manufactured by Toyo Morton K.K. Japan, and a polyester primer as AD-503 (trade name) manufactured by the said company. Such primers are applied so as to give a basis weight of from 0.5 g/m$^2$ to 25 g/m$^2$.

Optional Layers:

In addition to the stretched microporous resin film base layer (I), the heat sealable resin adhesive layers (Ia) and (IV), the gas barrier resin film layer (II), the inorganic oxide thin film layer (III) and the primer layer (Ib), the packaging material may further comprise a woven fabric, a nonwoven fabric, an opacifying layer, pulp paper and/or a foamed resin layer interposed between the heat sealable resin adhesive layer (Ia) and the stretched microporous resin film base layer (I), and/or between the gas barrier resin film layer (II) and the stretched microporous resin film base layer (I), for improving the stiffness, tear resistance and light untransmrittance of the packaging material.

The woven fabric used for imparting the tear resistance, sewing properties, thermal curl resistance and light untransmittance to the packaging material is a plain weave fabric (pongee) which is woven of warp and weft threads of 40 to 150 denier, preferably 50 to 100 denier, intersecting each other for every one thread. The number of the warp threads (ends) and that of the weft threads (picks) are each from 50 to 140, and preferably from 60 to 100, per 2.54 cm, and the woven fabric has a basis weight of from 50 g/m$^2$ to 200 g/m$^2$, preferably from 50 g/m$^2$ to 100 g/m$^2$ (JP-A-7-52298 and JP-A-7-227941). All of the ranges listed above include all specific values and subranges therebetween.

Materials for the warp and weft threads of the plain weave fabric include nylon 6, nylon 66, polyethylene terephthalate, cotton, rayon, polyacrylonitrile, polyethylene fluoride, polypropylene and polyvinylidene fluoride.

The fineness of the warp and weft threads, which may be the same or different, is from 40 to 150 denier. From the standpoint of smoothness, they preferably have the same fineness. Further, for reinforcement, one or two threads per 2.54 cm having a larger diameter than the others may be additionally used in the warp and/or weft threads.

Preferred examples of the nonwoven fabrics include nonwoven fabric sheets having a basis weight of from 12 g/m$^2$ to 80 g/m$^2$ obtained by heating and pressing nonwoven fabric-like materials in which staple fibers are entangled, and fiber-reinforced nonwoven fabric sheets having a basis weight of from 60 g/m$^2$ to 200 g/m$^2$ obtained by spraying thermoplastic resin powders on said nonwoven fabric-like materials and/or laminating said nonwoven fabric-like materials with thermoplastic resin sheets, and then integrating the resulting products by heating and pressing (JP-B-3-74180).

Methods for producing the nonwoven fabric sheets obtained by heating and pressing the nonwoven fabric-like materials in which staple fibers are entangled are known as described in JP-B-37-7993, JP-A-53-10704, JP-A-53-90404, JP-A-53-119305, JP-A-53-122803, JP-A-56-15500, JP-A-57-29700, JP-A-57-39299, JP-A-59-70600, JP-A-57-61796 and JP-A-57-139597.

Usually, the nonwoven fabric sheets are produced by dispersing opened staple fibers (fiber fineness: 0.2 to 15 denier, fiber length: 1 to 20 mm) in water, said staple fibers being made from thermoplastic resins such as polyethylene, polypropylene, polyamides and polyesters, treating the resulting stock by use of a Fourdrinier or cylinder paper machine to make paper, and then applying a temperature of from 120° C. to 270° C. and a pressure of from 5 kg/cmto 200 kg/cm$^2$ to the paper with a roll and a press. Such sheets are on the market in the trade name of Spanbond # Unicel (type RT, type B and type BT) from Teijin Ltd.

In making paper, 10% to 90% by weight of pulp-like particles may be added to an aqueous dispersion. Raw materials for the pulp-like particles include aromatic polyamides and aromatic polyesters. Further, fibrous polyvinyl alcohol binders or powders of thermoplastic resins such as polyethylene, polyesters, polyamides and polypropylene may be added in an amount of from 5% to 30% by weight as binders for staple fibers. Furthermore, pigments, plasticizers, adhesive regulators and dispersing agents may be added.

Alternatively, the thermoplastic resin powders may be sprayed on the nonwoven fabric-like materials obtained by the paper making procedure and/or laminated with the thermoplastic resin sheets, followed by integration of the resulting products by heating and pressing to produce the nonwoven fabric sheets. Thermoplastic resins used as materials for the powders and sheets include polyethylene, polypropylene, polyvinyl chloride, polyvinylidene chloride, polystyrene, styrene-butadiene-acrylonitrile copolymers, polyamides, copolyamides, polycarbonates, polyacetals, polymethyl methacrylate, polysulfones, polyphenylene oxide, polyesters, copolyesters, polyphenylene sulfide, polyetheretherketones, polyethersulfones, polyetherimides, polyamideimides, polyimides, polyurethanes, polyetheresters, polyetheramides and polyesteramides. They can be used as a mixture of two or more of them.

Further, the nonwoven fabric sheet may be nonwoven fabric paper obtained by a producing method described in JP-B-48-32986, that is to say, by exposing a web comprising at least 75% by weight of randomly arranged, crystalline, oriented synthetic organic polymer filaments to a heated fluid having no solubility to said filaments to self-fuse said filaments together at many intersections arranged at spatial intervals, continuing to restrict the resulting web under slight compression, and then, removing said restriction only after the temperature of said web has been lowered to a temperature sufficient for preventing the contraction of said filaments. Such nonwoven fabric paper is on the market in the trade name of "Tyvec" from E. I. du Pont de Nemours and Company, U.S.A.

Layers used for giving stiffness and folding properties to the packaging materials in the use thereof as carton boxes are carton paper having a thickness of from 80 μm to 700 μm, white cardboard, extruded resin sheets foamed at a foaming ratio of from 1.5 to 5, and thermoplastic resin sheets containing 25% to 55% by weight of fine inorganic powders (JP-A-5-245962 and JP-A-6-91795).

These optional layers can be adhered by use of primers and heat sealable resins already described.

The packaging material of the present invention satisfies the following requirements:
(i) It has a water vapor permeability (JIS Z-0208) of 5 g/m$^2$·24 hr or less, preferably 2 g/m$^2$·24 hr or less, more preferably 1 g/m$^2$·24 hr or less; and
(ii) It has an oxygen permeability (JIS Z-1707) of 5 cc/m$^2$·24 hr·atm or less, preferably 2 cc/m$^2$·24 hr·atm or less, more preferably 1 cc/m$^2$·24 hr·atm or less.

The satisfaction of such requirements prevents contents from changes and deterioration in quality of the packaged material. Further, when the packaging materials are used for packaging contents easily damaged by incidence of light, such as coffee beans, high-grade green tea, powdered green tea, fruit juice and shochu, the total light beam transmittance (JIS K-7105) of the packaging materials is required to be 0%. As noted above, the total light beam transmittance refers to this value as measured JIS K-7105.

When the thickness of each layer is too thin to sufficiently shade light, a black solid print layer having a thickness of from 1 μm to 5 μm is formed on the back of the stretched microporous resin film base layer (I) by offset or gravure printing to form an opacifying layer, or a primer adhesive containing a large amount (5% to 75% by weight) of a white filler such as titanium oxide whiskers or fine titanium oxide particles is applied in an amount of from 2 g/m$^2$ to 10 g/m$^2$ as the primer layer for adhering the stretched microporous resin film base layer (I) to the gas barrier resin film layer (II) to form an opacifying layer, thereby reducing the total light beam transmittance of the packaging material to 0%.

The packaging materials for packaging bag application have a thickness of from 80 μm to 350 μm, preferably from 80 μm to 150 μm so as to give flexibility, and those for carton box application have a thickness of from 350 μm to 1,000 μm so as to give shape keeping ability. These ranges include all specific values and subranges therebetween.

The present invention will be described in more detail by reference to the following examples, but should not be construed as being limited thereto.

Production Examples of Stretched Microporous Resin Films (Production Example 1)

(1) A composition (a) consisting of 81% by weight of polypropylene having a melt flow rate (MFR) (ASTM D1238: 230° C., 2.16 kg load) of 0.8 g/10 minutes (melting point: about 164° C. to 167° C.), 3% by weight of high-density polyethylene and 16% by weight of calcium carbonate having an average particle size of 1.5 μm was melt-kneaded in an extruder set at a temperature of 270° C., extruded into the sheet form, and further cooled on a cooling roll to obtain an unstretched sheet.

This sheet was reheated to a temperature of 150° C., and then, stretched in the machine direction at a stretch ratio of 5 by utilizing the difference in circumferential speed between rolls to obtain a stretched film.

(2) A composition (b) consisting of 54% by weight of polypropylene having an MFR of 4 g/10 minutes (melting point: about 164° C. to 167° C.) and 46% by weight of calcium carbonate having an average particle size of 1.5 μm was melt-kneaded in separate extruders at a temperature of 210° C., and the resulting melts were extruded through dies into the sheet form. Then, the extruded sheets were each laminated on both sides of the stretched film obtained in the above-mentioned step (1) to obtain a laminated film having the three-layer structure. Thereafter, the laminated film having the three-layer structure was cooled to a temperature of 60° C., and reheated to a temperature of about 155° C., at which temperature it was stretched in the transverse direction at a stretch ratio of 7.5 with a tenter. After the stretched laminated film was annealed at a temperature of 165° C., it was cooled to a temperature of 60° C. After both sides of the film was subjected to corona discharge treatment, the film was trimmed to obtain a stretched resin film having the three-layer structure (uniaxially stretched film/biaxially stretched film/uniaxially stretched film). The stretched laminated film thus obtained had a thickness of 80 μm (b/a/b =31 μm/60 μm/31 μm), an opacity of 87%, a void volume of 31%, a density of 0.78 g/cm$^3$, a water vapor permeability (air permeability; temperature: 40° C., relative humidity: 90%) of 3.4 g/m$^2$·24 hr, an oxygen permeability of 920 cc/m$^2$·24 hr·atm and a total light beam transmittance of 14%.

(Production Example 2)

A stretched resin film was obtained in the same manner as with Production Example 1 with the exception that the lip widths of the respective dies were changed so as to give thicknesses of the respective layers (b/a/b) of 15 μm/30 μm/15 μm (total thickness: 60 μm). The stretched resin film had an opacity of 82%, a void volume of 33%, a density of 0.79 g/cm$^3$, a water vapor permeability of 6.0 g/m$^2$·24 hr, an oxygen permeability of 1,360 cc/m$^2$·24 hr·atm and a total light beam transmittance of 21%.

(Production Example 3)

(1) A composition consisting of 55% by weight of polypropylene having an MFR of 4 g/10 minutes (melting point: about 164° C. to 167° C.), 25% by weight of high-density polyethylene and 20% by weight of calcium carbonate having an average particle size of 1.5 μm was melt-kneaded in an extruder set at a temperature of 270° C., extruded into the sheet form, and further cooled on a cooling roll to obtain an unstretched sheet.

(2) This sheet was reheated to a temperature of 150° C., and then, stretched in the machine direction at a stretch ratio of 5 to obtain a stretched film.

Then, this film was reheated to a temperature of about 155° C., at which temperature it was stretched in the transverse direction at a stretch ratio of 7.5 with a tenter. After the stretched film was annealed at a temperature of 165° C., it was cooled to a temperature of 60° C. After both sides of the film was subjected to corona discharge treatment, the film was trimmed to obtain a stretched resin film having a thickness of 60 μm, an opacity of 86%, a void volume of 37%, a density of 0.88 g/cm$^3$, a water vapor permeability of 7.2 g/m$^2$·24 hr, an oxygen permeability of 1,680 cc/m$^2$·24 hr·atm and a total light beam transmittance of 23%.

(Production Example 4)

(1) A composition (A) consisting of 70% by weight of polypropylene having an MFR of 4 g/10 minutes (melting point: about 164° C. to 167° C.), 8% by weight of high-density polyethylene and 22% by weight of calcium carbonate having an average particle size of 1.5 μm, and a composition (B) consisting of 40% by weight of polypropylene having an MFR of 20 g/10 minutes (melting point: about 164° C. to 167° C.), 60% by weight of calcium carbonate having an average particle size of 1.5 μm were melt-kneaded in separate extruders at a temperature of 270° C., and the resulting melts were co-extruded so that the composition (B) was arranged on both sides of the composition (A) disposed as a core layer to form a laminated sheet. Then, the sheet was cooled with a cooling machine to obtain an unstretched sheet having the three-layer structure.

Then, this sheet was heated to a temperature of 135° C., and then, stretched in the machine direction at a stretch ratio of 5 to obtain a uniaxially stretched film.

Further, both sides of this film was subjected to corona discharge treatment to obtain a stretched film having the three-layer structure (uniaxially stretched film/uniaxially stretched film/uniaxially stretched film). The stretched laminated film thus obtained had a thickness of 80 μm (B/A/B= 10 μm/60 μm/10 μm), an opacity of 87%, a void volume of 29%, a density of 0.85 g/cm$^3$, a water vapor permeability (air permeability; temperature: 40° C., relative humidity: 90%) of 3.0 g/m$^2$·24 hr, an oxygen permeability of 920 cc/m$^2$·24 hr·atm and a total light beam transmittance of 16%.

(Production Example 5)

(1) A composition (A) consisting of 81% by weight of polypropylene having an MFR of 0.8 g/10 minutes (melting point: about 164° C. to 167° C.), 3% by weight of high-density polyethylene and 16% by weight of calcium carbonate having an average particle size of 1.5 μm was melt-kneaded in an extruder set at a temperature of 270° C., extruded into the sheet form, and further cooled with a cooling machine to obtain an unstretched sheet.

This sheet was reheated to a temperature of 150° C., and then, stretched in the machine direction at a stretch ratio of 5 to obtain a stretched film.

Then, a composition (B) consisting of 54% by weight of polypropylene having an MFR of 4 g/10 minutes (melting point: about 164° C. to 167° C.) and 46% by weight of calcium carbonate having an average particle size of 1.5 μm, and low-density polyethylene (melting point: about 109° C. to 113° C.) (C) having an MFR (ASTM D1238: 190° C., 2.16 kg load) of 4 g/10 minutes were each melt-kneaded in separate extruders at a temperature of 280° C., and the resulting melts were extruded through dies into the sheet form. Then, the extruded sheets were each laminated on both sides of the stretched film obtained in the above-mentioned step (1) to obtain a laminated film having the five-layer structure (C/B/A/B/C). Thereafter, the laminated film having the five-layer structure was cooled to a temperature of 60° C., and reheated to a temperature of about 155° C., at which temperature it was stretched in the transverse direction at a stretch ratio of 7.5 with a tenter. After the stretched laminated film was annealed at a temperature of 165° C., it was cooled to a temperature of 60° C. After both sides of the film was subjected to corona discharge treatment, the film was trimmed to obtain a stretched resin film having the five-layer structure (uniaxially stretched film/uniaxially stretched film/biaxially stretched film/uniaxially stretched film/uniaxially stretched film). The stretched laminated film thus obtained had a thickness of 90 $\mu$m (C/B/A/B/C=10 $\mu$m/10 $\mu$m/50 $\mu$m/10 $\mu$m/10 $\mu$m), an opacity of 86%, a void volume of 26%, a density of 0.82 g/cm$^3$, a water vapor permeability (air permeability; temperature: 40° C., relative humidity: 90%) of 3.4 g/m$^2$·24 hr, an oxygen permeability of 1,260 cc/m$^2$·24 hr·atm and a total light beam transmittance of 17%.

(2) A resin composition (D) consisting of 3% by weight of calcium carbonate having a particle size of 0.8 $\mu$m and 97% by weight of a propylene-ethylene block copolymer having an MFR of 1.2 g/10 minutes, and a resin composition (E) consisting of 25% by weight of calcium carbonate having a particle size of 1.0 $\mu$m, 28% by weight of a propylene-ethylene block copolymer having an MFR of 1.2 g/10 minutes, 48% by weight of a propylene homopolymer having an MFR of 4 g/10 minutes and 5% by weight of low-density polyethylene were each melt-kneaded in separate extruders at a temperature of 260° C. The resulting melts were fed to a die, and laminated with each other (D/E/D=12 $\mu$m/300 $\mu$m/12 $\mu$m) in said die, followed by extrusion lamination thereof on one side of the five-layered stretched film obtained in (1) described above. Then, the resulting film was cooled by compression between rolls to obtain a laminated film having a thickness of 414 $\mu$m.

(Production Example 6)

The multilayered stretched resin film obtained in Production Example 1 was coated on one side thereof with an adhesive consisting of 85% by weight of a mixture of polyurethane anchor coating agents "BLS-2080A" and "BLS-2080B", manufactured by Toyo Morton K.K., Japan and 15% by weight of titanium oxide in an amount of 4 g/m$^2$ (on a solid basis). Subsequently, a plain weave fabric "Pongee #6575" manufactured by Toray Industries, Inc. was bonded thereto by means of pressure rolls to obtain a composite film composed of weave fabric/opacifying layer/stretched resin film. This film had a thickness of 126 $\mu$m, an opacity of 100% and a total light beam transmittance of 0%.

Production Examples of SiO$_2$-Deposited Gas Barrier Films (Production Example 7)

A 12-$\mu$m thick biaxially stretched polyethylene terephthalate film (stretched in the machine direction at a stretch ratio of 3 and in the transverse direction at a stretch ratio of 3) was coated on one side thereof with a primer composed of an isocyanate compound (Coronate L manufactured by Nippon Polyurethane Industry Co., Ltd.) and a saturated polyester (Vylon 300 manufactured by Toyobo Co., Ltd.) at a ratio of 50:50, followed by drying to form a resin layer having a thickness of about 0.1 $\mu$m.

Then, SiO$_2$ having a purity of 99.9% was evaporated onto the resin layer by the high frequency induction heating system under vacuum of 8×10$^{-5}$ Torr to form a 50-nm thick SiO$_2$ film.

This had a water vapor permeability of 1.0 g/m$^2$·24 hr, an oxygen permeability of 0.5 cc/m$^2$·24 hr·atm and a total light beam transmittance of 84%.

(Production Example 8)

A biaxially stretched polyethylene terephthalate film on which SiO$_2$ was deposited was obtained in the same manner as with Production Example 7 with the exception that the thickness of the silicon oxide film was changed to 300 nm. The resulting film had a water vapor permeability of 0.7 g/m$^2$·24 hr, an oxygen permeability of 0.4 cc/m$^2$·24 hr·atm and a total light beam transmittance of 77%. Gravure printing was made on this film side.

Production Examples of Amorphous Aluminum Oxide-Deposited Gas Barrier Films (Production Example 9)

A 12-$\mu$m thick biaxially stretched polyethylene terephthalate film (stretched in the machine direction at a stretch ratio of 3 and in the transverse direction at a stretch ratio of 3) was coated on one side thereof with a primer composed of an isocyanate compound (Coronate L manufactured by Nippon Polyurethane Industry Co., Ltd.) and a saturated polyester (Vylon 300 manufactured by Toyobo Co., Ltd.) at a ratio of 50:50, followed by drying to form a resin layer having a thickness of about 0.1 $\mu$m.

Then, Al$_2$O$_3$ having a purity of 99.9% was evaporated onto the resin layer by the high frequency induction heating system under vacuum of 8×10$^{-5}$ Torr to form a 100-nm thick amorphous aluminum oxide film.

This Al$_2$O$_3$-deposited, biaxially stretched polyethylene terephthalate film had a water vapor permeability of 3 g/m$^2$·24 hr, an oxygen permeability of 3 cc/m$^2$·24 hr·atm and a total light beam transmittance of 86%.

(Production Example 10)

A biaxially stretched polyethylene terephthalate film on which amorphous aluminum oxide was deposited was obtained in the same manner as with Production Example 9 with the exception that the thickness of the Al$_2$O$_3$ film was changed to 500 nm. The resulting film had a water vapor permeability of 2 g/m$^2$·24 hr, an oxygen permeability of 2 cc/m$^2$·24 hr·atm and a total light beam transmittance of 85%.

EXAMPLE 1

Offset printing was made on the surface of the 80-$\mu$m thick stretched microporous resin film obtained in Production Example 1, and then, both sides thereof were each coated in an amount of 4 g/m$^2$ (on a solid basis) with an adhesive consisting of 85% by weight of a mixture of polyurethane anchor coating agents "BLS-2080A" and "BLS-2080B" manufactured by Toyo Morton K.K., Japan and 15% by weight of titanium oxide. Then, a low-density polyethylene film having a density of 0.910 g/cm$^3$, an MFR of 4 g/10 minutes and a thickness of 30 $\mu$m was adhered to the back side thereof, and the film side of the SiO$_2$-deposited, biaxially stretched polyethylene terephthalate film obtained in Production Example 7 was adhered to the opposite printed surface to produce a packaging material having a thickness of about 134 $\mu$m This packaging material had an opacity of 100%, a total light beam transmittance of 0%, a water vapor permeability of 0.0 g/m$^2$·24 hr and an oxygen permeability of 0.2 cc/m$^2$·24 hr·atm.

One of two sheets of this packaging material was placed over the other so that the low-density polyethylene sides thereof faced each other, and after no inclusion of a metal powder was confirmed with a metal detector from the outside of the bag, three sides thereof were sealed in 10 mm width at 190° C. for 30 seconds by heat impulse sealing to form a bag having a length of 180 mm and a width of 120 mm.

This bag was filled with 50 g of high-grade green tea, and the opened portion thereof was heat sealed, followed by standing in a thermostatic chamber of 25° C. and 75% relative humidity for 3 months.

Then, the bag was opened, and the change in color and the flavor of the green tea were examined. As a result, the color and flavor were by no means inferior to those of newly-picked tea before packaging.

EXAMPLE 2

Both sides of the 60-$\mu$m thick stretched microporous resin film obtained in Production Example 2 were each coated in an amount of 0.5 g/m$^2$ (on a solid basis) with a polyurethane primer mixture manufactured by Toyo Morton K.K., Japan. Then, the printed surface of the SiO$_2$-deposited, biaxially stretched polyethylene terephthalate film obtained in Production Example 8 was adhered to the surface side thereof, and a 40-$\mu$m thick low-density polyethylene film was adhered to the other side (back) to obtain a packaging material having a thickness of about 113 $\mu$m, a water vapor permeability of 0.1 g/m$^2$·24 hr, an oxygen permeability of 0.3 cc/m$^2$·24 hr·atm, an opacity of 89% and a total light beam transmittance of 14%.

A bag having the same size as that of Example 1 was prepared in the same manner as with Example 1, and filled with candy. After sealing, it was allowed to stand in a chamber for 3 months. The examination of the candy after 3 months showed no changes in appearance and taste.

EXAMPLE 3

A packaging material was obtained in the same manner as with Example 1 with the exception that the 60-$\mu$m thick stretched resin film obtained in Production Example 3 was used in place of the stretched microporous resin film obtained in Production Example 1. The packing material had a thickness of 114 $\mu$m, an opacity of 100%, a total light beam transmittance of 0%, a water vapor permeability of 0.9 g/m$^2$·24 hr and an oxygen permeability of 0.5 cc/m$^2$·24 hr·atm.

A bag was prepared in the same manner as with Example 1, and filled with 60 g of a bathing agent powder. After the opened portion of the bag was heat sealed, no inclusion of a metal powder was confirmed with a metal detector from the outside of the bag. Then, the bag was allowed to stand in a thermostatic chamber of 40° C. and 90% relative humidity for 3 months, and thereafter opened.

No blocking and no change in quality of the bathing agent were observed.

EXAMPLE 4

A packaging material was obtained in the same manner as with Example 1 with the exception that the 80-$\mu$m thick stretched resin film obtained in Production Example 4 was used in place of the stretched microporous resin film obtained in Production Example 1. The packing material had a thickness of 133 $\mu$m, an opacity of 100%, a total light beam transmittance of 0%, a water vapor permeability of 0.1 g/m$^2$·24 hr and an oxygen permeability of 0.3 cc/m$^2$·24 hr·atm.

A bag was prepared in the same manner as with Example 1, and filled with 50 g of high-grade green tea, and the opened portion thereof was heat sealed, followed by standing in a thermostatic chamber of 25° C. and 75% relative humidity for 3 months.

Then, the bag was opened, and the change in color and the flavor of the green tea were examined. As a result, the color and flavor were by no means inferior to those of newly-picked tea before packaging.

EXAMPLE 5

A polyesterpolyol-polyisocyanate urethane adhesive was applied in an amount of 2 g/m2 onto the SiO$_2$-deposited film surface of the SiO$_2$-deposited, biaxially stretched polyethylene terephthalate film obtained in Production Example 8, and low-density polyethylene was melt-extruded thereon to dry laminate the polyethylene terephthalate film with a low-density polyethylene film, thereby obtaining a laminated film-having a thickness of about 34 $\mu$m.

A polyesterpolyol-polyisocyanate adhesive was applied in an amount of 4 g/m$^2$ onto the E side of the 414-$\mu$m thick laminated film obtained in Production Example 5, and then, the above-mentioned 34-$\mu$m thick laminated film was placed thereon so that the biaxially stretched polyethylene terephthalate film side of the 34-$\mu$m thick laminated film came into contact with the adhesive side of the 414-$\mu$m thick laminated film, followed by pressure bonding with pressure rolls to obtain a packaging material (452 $\mu$m in thickness) for a carton box.

This packaging material was cut, and assembled into a box-like form. Then, adhesive portions were heat sealed to form a 1-liter carton box.

Sake was poured into the box, and the opened portion was heat sealed, followed by storage for 3 months. Then, the box was opened and sake was tasted. As a result, it was not different from sake of the same brand stored in a brown bottle in taste.

EXAMPLE 6

In Example 1 the composite sheet obtained in Production Example 6 was used in place of the stretched microporous resin film obtained in Production Example 1 to obtain a packaging material having the structure of SiO$_2$-deposited, biaxially stretched polyethylene terephthalate film/primer layer/printed microporous resin film/opacifying layer/plain weave fabric/primer layer/heat sealable polyethylene terephthalate layer.

The packing material had a thickness of about 180 $\mu$m, an opacity of 100%, a total light beam transmittance of 0%, a water vapor permeability of 0.0 g/m$^2$·24 hr and an oxygen permeability of 0.1 cc/m$^2$·24 hr·atm.

One of two sheets of this packaging material was placed over the other so that the low-density polyethylene sides thereof faced each other, and three sides thereof were sealed in 15 mm width to form a bag having a length of 300 mm and a width of 210 mm.

This bag was filled with 200 g of coffee beans, and the opened portion thereof was heat sealed, followed by storage in a chamber of 40° C. and 75% relative humidity for 3 months.

After 3 months, the bag was opened, and the coffee beans were examined. As a result, no change in color was observed. The order and taste of coffee brewed from the beans with hot water of 95° C. were little different from those of coffee brewed from beans before packaging.

EXAMPLE 7

A packaging material having a thickness of about 134 $\mu$m was obtained in the same manner as with Example 1 with the exception that the aluminum oxide-deposited, biaxially stretched polyethylene terephthalate film obtained in Production Example 9 was used in place of the SiO$_2$-deposited, biaxially stretched polyethylene terephthalate film obtained in Production Example 7.

The packing material had an opacity of 100%, a total light beam transmittance of 0%, a water vapor permeability of 2 g/m$^2$·24 hr and an oxygen permeability of 1 cc/m$^2$·24 hr·atm.

A bag was prepared in the same manner as with Example 1, and filled with 50 g of high-grade green tea, and the opened portion thereof was heat sealed, followed by standing in a thermostatic chamber of 25° C. and 75% relative humidity for 3 months.

Then, the bag was opened, and the change in color and the flavor of the green tea were examined. As a result, the color and flavor were by no means inferior to those of newly-picked tea before packaging.

EXAMPLE 8

A packaging material was obtained in the same manner as with Example 4 with the exception that the aluminum oxide-deposited, biaxially stretched polyethylene terephthalate film obtained in Production Example 10 was used in place of the SiO$_2$-deposited, biaxially stretched polyethylene terephthalate film obtained in Production Example 8. The packing material had a thickness of about 133 μm, an opacity of 100%, a total light beam transmittance of 0%, a water vapor permeability of 3 g/m$^2$·24 hr and an oxygen permeability of 2 cc/m$^2$·24 hr·atm.

A bag was prepared in the same manner as with Example 1, and filled with 60 g of a bathing agent powder. After the opened portion of the bag was heat sealed, no inclusion of a metal powder was confirmed with a metal detector from the outside of the bag. Then, the bag was allowed to stand in a thermostatic chamber of 40° C. and 90% relative humidity for 3 months, and thereafter opened.

No blocking and no change in quality of the bathing agent were observed.

EXAMPLE 9

Offset printing was made on the surface of the stretched microporous resin film obtained in Production Example 1, and then, the back side thereof was coated in an amount of 4 g/m$^2$ (on a solid basis) with an adhesive consisting of 85% by weight of a mixture of polyurethane primers "BLS-2080A" and "BLS-2080B" manufactured by Toyo Morton K.K., Japan and 15% by weight of titanium oxide. Then, the biaxially stretched polyethylene terephthalate film side of the SiO$_2$-deposited, biaxially stretched polyethylene terephthalate film obtained in Production Example 7 was adhered thereto, and the resulting laminated film was further laminated with an ethylene-methyl methacrylate copolymer film (30 μm in thickness) having a melting point of 105° C. by extrusion at a temperature of 230° C. to produce a packaging material having a thickness of about 128 μm.

This packaging material showed an opacity of 100%, a total light beam transmittance of 0%, a water vapor permeability of 0.0 g/m$^2$·24 hr and an oxygen permeability of 0.2 cc/m$^2$·24 hr·atm.

One of two sheets of this packaging material was placed over the other so that the ethylene-methyl methacrylate copolymer film sides thereof faced each other, and three sides thereof were sealed in 10 mm width at 190° C. for 30 seconds by heat impulse sealing to form a bag having a length of 180 mm and a width of 120 mm. Then, no inclusion of a metal powder was confirmed with a metal detector from the outside of the bag.

This bag was filled with 50 g of high-grade green tea, and the opened portion thereof was heat sealed, followed by standing in a thermostatic chamber of 25° C. and 75% relative humidity for 3 months.

After 3 months, the bag was opened, and the change in color and the flavor of the green tea were examined. As a result, the color and flavor were by no means inferior to those of newly-picked tea before packaging.

EXAMPLE 10

Offset printing was made on the surface of the 60-μm thick stretched microporous resin film obtained in Production Example 2, and then, the back side thereof was coated in an amount of 4 g/m$^2$ (on a solid basis) with a polyurethane primer mixture manufactured by Toyo Morton K.K., Japan. Then, the SiO$_2$-deposited surface of the SiO$_2$-deposited, biaxially stretched polyethylene terephthalate film obtained in Production Example 8 was adhered thereto, and a 40-μm thick low-density polyethylene film was laminated on the back side thereof by extrusion at 230° C. to form a heat sealable layer, thereby obtaining a packaging material having a thickness of about 113 μm, a water vapor permeability of 0.1 g/m$^2$·24 hr, an oxygen permeability of 0.3 cc/m$^2$·24 hr·atm, an opacity of 89% and a total light beam transmittance of 14%.

Then, a bag having the same size as that of Example 9 was prepared in the same manner as with Example 9, and filled with candy. After sealing, it was allowed to stand in a chamber for 3 months. The examination of the candy after 3 months showed no changes in appearance and taste.

EXAMPLE 11

A packaging material was obtained in the same manner as with Example 9 with the exception that the stretched resin film obtained in Production Example 3 was used in place of the stretched microporous resin film obtained in Production Example 1. The packing material had a thickness of about 108 μm, an opacity of 100%, a total light beam transmittance of 0%, a water vapor permeability of 1 g/m$^2$·24 hr and an oxygen permeability of 0.5 cc/m$^2$·24 hr·atm.

A bag was prepared in the same manner as with Example 9, and filled with 60 g of a bathing agent powder. After the opened portion of the bag was heat sealed, no inclusion of a metal powder was confirmed with a metal detector from the outside of the bag. Then, the bag was allowed to stand in a thermostatic chamber of 40° C. and 90% relative humidity for 3 months.

After 3 months, the bag was opened. As a result, no blocking and no change in quality of the bathing agent were observed.

EXAMPLE 12

A packaging material was obtained in the same manner as with Example 9 with the exception that the 80-μm thick stretched resin film obtained in Production Example 4 was used in place of the stretched microporous resin film obtained in Production Example 1. The packing material had a thickness of about 127 μm, an opacity of 100%, a total light beam transmittance of 0%, a water vapor permeability of 0.2 g/m$^2$·24 hr and an oxygen permeability of 0.3 cc/m$^2$·24 hr·atm.

A bag was prepared in the same manner as with Example 9, and filled with 50 g of high-grade green tea, and the opened portion thereof was heat sealed, followed by standing in a thermostatic chamber of 25° C. and 75% relative humidity for 3 months.

Then, the bag was opened, and the change in color and the flavor of the green tea were examined. As a result, the color and flavor were by no means inferior to those of newly-picked tea before packaging.

EXAMPLE 13

In Example 9, the composite sheet obtained in Production Example 6 was used in place of the stretched microporous resin film obtained in Production Example 1 to obtain a packaging material having the structure of printed microporous resin film/opacifying layer/plain weave fabric/ primer layer/$SiO_2$-deposited, biaxially stretched polyethylene terephthalate film/heat sealable ethylene-methyl methacrylate copolymer film layer (30 μm).

The packing material had a thickness of about 175 μm, an opacity of 100%, a total light beam transmittance of 0%, a water vapor permeability of 0.0 $g/m^2 \cdot 24$ hr and an oxygen permeability of 0.1 $cc/m^2 \cdot 24$ hr·atm.

One of two sheets of this packaging material was placed over the other so that the heat sealable ethylenemethyl methacrylate copolymer film sides thereof faced each other, and three sides thereof were sealed in 15 mm width to form a bag having a length of 300 mm and a width of 210 mm.

This bag was filled with 200 g of coffee beans, and the opened portion thereof was heat sealed, followed by storage in a chamber of 40° C. and 75% relative humidity for 3 months.

After 3 months, the bag was opened, and the coffee beans were examined. As a result, no change in color was observed. The order and taste of coffee brewed from the beans with hot water of 95° C. were little different from those of coffee brewed from beans before packaging.

EXAMPLE 14

Offset printing was made on the surface (C side) of the stretched resin film of the 414-μm thick laminated sheet film obtained in Production Example 5.

Then, the $SiO_2$-deposited surface of the $SiO_2$-deposited, biaxially stretched polyethylene terephthalate film obtained in Production Example 8 was laminated on the back thereof with an ethylene-methyl acrylate copolymer film (10 μm in thickness) having a melting point of 105° C. by extrusion at a temperature of 230° C. to obtain a laminate. Subsequently, a polyesterpolyol-polyisocyanate adhesive was applied in an amount of 4 $g/m^2$ onto the D side of the above-mentioned laminated sheet on the surface of which the printing was made, and the above-mentioned $SiO_2$-deposited laminate was placed thereon so that the SiO2 side of the laminate came into contact with the adhesive side of the 414 μm thick laminated sheet, followed by pressure bonding with pressure rolls to obtain a packaging material (about 460 μm in thickness) for a carton box.

This packaging material was cut, and assembled into a box-like form. Then, adhesive portions were heat sealed to form a 1-liter carton box.

Sake was poured into the box, and the opened portion was heat sealed, followed by storage for 3 months. Then, the box was opened and sake was tasted. As a result, it was not different from sake of the same brand stored in a brown bottle in taste.

EXAMPLE 15

Offset printing was made on the surface of the stretched microporous resin film obtained in Production Example 1, and then, the back side thereof was coated in an amount of 4 $g/m^2$ (on a solid basis) with an adhesive consisting of 85% by weight of a mixture of polyurethane primers "BLS-2080A" and "BLS-2080B" manufactured by Toyo Morton K.K., Japan and 15% by weight of titanium oxide. Then, the back side of the aluminum oxide-deposited, biaxially stretched polyethylene terephthalate film obtained in Production Example 7 was adhered thereto, and a low-density polyethylene film having a density of 0.910 $g/cm^3$, an MFR of 4 g/10 minutes and a thickness of 10 μm was further adhered thereto to produce a packaging material having a thickness of about 108 μm.

This packaging material had an opacity of 100%, a total light beam transmittance of 0%, a water vapor permeability of 2 $g/m^2 \cdot 24$ hr and an oxygen permeability of 1 $cc/m^2 \cdot 24$ hr·atm.

One of two sheets of this packaging material was placed over the other so that the low-density polyethylene film sides thereof faced each other, and three sides thereof were sealed in 10 mm width at 190° C. for 30 seconds by heat impulse sealing to form a bag having a length of 180 mm and a width of 120 mm. The heat impulse sealing was performed while confirming no inclusion of a metal powder with a metal detector from the outside of the bag.

This bag was filled with 50 g of high-grade green tea, and the opened portion thereof was heat sealed, followed by standing in a thermostatic chamber of 25° C. and 75% relative humidity for 3 months.

Then, the bag was opened, and the change in color and the flavor of the green tea were examined. As a result, the color and flavor were by no means inferior to those of newly-picked tea before packaging.

EXAMPLE 16

A packaging material was obtained in the same manner as with Example 15 with the exception that the 80-μm thick stretched resin film obtained in Production Example 4 was used in place of the stretched microporous resin film obtained in Production Example 1. The packing material had a thickness of about 108 μm, an opacity of 100%, a total light beam transmittance of 0%, a water vapor permeability of 0.2 $g/m^2 \cdot 24$ hr and an oxygen permeability of 0.3 $cc/m^2 \cdot 24$ hr·atm.

A bag was prepared in the same manner as with Example 15, and filled with 50 g of high-grade green tea, and the opened portion thereof was heat sealed, followed by standing in a thermostatic chamber of 25° C. and 75% relative humidity for 3 months.

Then, the bag was opened, and the change in color and the flavor of the green tea were examined. As a result, the color and flavor were by no means inferior to those of newly-picked tea before packaging.

The packaging materials of the present invention are excellent in light shading and gas barrier properties, and containers such as the bags and the carton boxes formed of the packaging materials can be examined for inclusion of metal powders in the contents from the outside thereof.

All publications cited in this disclosure are incorporated herein in their entirety.

Japanese Patent Application Hei 9-62970, filed Mar. 17, 1997, is incorporated herein in its entirety.

Obviously, numerous modifications and variations of the present invention are possible in light of the above teachings. It is therefore to be understood that within the scope of the appended claims, the invention may be practiced otherwise than as specifically described herein.

What is claimed is:

1. A laminate, comprising:
   (I) a stretched microporous resin film base layer having a back side and a surface side, wherein the base layer has an opacity of at least 80%;
   (Ia) a heat sealable adhesive resin layer on the back side of the base layer;
   (II) a gas barrier resin film layer having a back side and a surface side, wherein the back side of the gas barrier resin film layer is on the surface side of the base layer; and
   (III) an inorganic oxide thin film layer having a back side and a surface side, wherein the back side of the inorganic oxide thin film layer is on the surface side of the gas barrier resin film layer,
   wherein the laminate:
      (i) has a water vapor permeability of at most 5 g/m$^2 \cdot$24 hr, and
      (ii) has an oxygen permeability of at most 5 cc/m$^2 \cdot$24 hr·atm.

2. The laminate according to claim 1, further comprising (IV) a heat sealable resin layer on the surface side of the inorganic oxide thin film layer.

3. The laminate according to claim 2, which has a total light beam transmittance of 0%.

4. The laminate according to claim 2, wherein the stretched microporous resin film base layer is a stretched laminated film comprising a uniaxially or biaxially stretched thermoplastic film containing 0% to 40% by weight of a fine white inorganic powder, as a core layer (A), and uniaxially stretched thermoplastic films containing 8% to 65% by weight of a fine white inorganic powder, said films being provided on both sides of said core layer (A) as surface and back layers B and B', respectively.

5. The laminate according to claim 4, wherein the stretched microporous resin films base layer has a void volume of from 10% to 60%, wherein the volume is specified by the following equation:

$$\text{void volume}(\%) = (\rho_0 - \rho)/\rho_0 \times 100$$

wherein
$\rho_0$ is the density of the unstretched resin film, and
$\rho$ is the density of the stretched resin film.

6. The laminate according to claim 1, which has a total light beam transmittance of 0%.

7. The laminate according to claim 1, wherein the stretched microporous resin film base layer is a stretched laminated film comprising a uniaxially or biaxially stretched thermoplastic film containing 0% to 40% by weight of a fine white inorganic powder, as a core layer (A), and uniaxially stretched thermoplastic films containing 8% to 65% by weight of a fine white inorganic powder, said films being provided on both sides of said core layer (A) as surface and back layers B and B', respectively.

8. The laminate according to claim 7, wherein the stretched microporous resin film base layer has a void volume of from 10% to 60%, wherein the void volume is specified by the following equation:

$$\text{void volume}(\%) = (\rho_0 - \rho)\rho_0 \times 100,$$

wherein
$\rho_0$ is the density of the unstretched resin film, and
$\rho$ is the density of the stretched resin film.

9. The laminate according to claim 1, which has a total thickness of 80 μm to 350 μm, and
the stretched microporous resin film base layer has a thickness of 30 μm to 300 μm,
the heat sealable adhesive resin layer has a thickness of 1 μm to 50 μm,
the gas barrier resin film layer has a thickness of 6 μm to 40 μm, and
the inorganic oxide thin film layer has a thickness of 5 nm to 600 nm.

10. The laminate according to claim 1, wherein the inorganic oxide thin film layer is a silicon oxide thin film layer.

11. The laminate according to claim 1, wherein the inorganic oxide thin film layer is an amorphous aluminum oxide thin film layer.

12. A method of making the laminate according to claim 1, comprising:
   providing the heat sealable adhesive resin layer on the back side of the base layer;
   providing the gas barrier resin film layer on the surface side of the base layer; and
   providing the inorganic oxide thin film layer on the surface side of the gas barrier resin film layer.

13. A method of making a packaged article, comprising packaging an article in a packaging material comprising the laminate according to claim 1.

14. The packaged article obtained according to the method of claim 13.

15. A composition, comprising an article packaged in a packaging material, wherein the packaging material comprises the laminate of claim 1.

16. A laminate, comprising:
   (I) a stretched microporous resin film base layer having a back side and a surface side, wherein the base layer has an opacity of at least 80%;
   (P) a print on the surface side of the base layer;
   (III) an inorganic oxide thin film layer on the back side of the base layer;
   (II) gas barrier resin film layer on the inorganic oxide thin film layer; and
   (IV) a heat sealable adhesive resin layer on the gas barrier resin film layer on the side opposite to the printed face of the base layer,
   wherein the laminate:
      (i) has a water vapor permeability of at most 5 g/m$^2 \cdot$24 h, and
      (ii) has an oxygen permeability of at most 5 cc/m$^2 \cdot$24 hr·atm.

17. The laminate according to claim 16, which has a total light beam transmittance of 0%.

18. The laminate according to claim 16, wherein the stretched microporous resin film base layer is a stretched laminated film comprising a uniaxially or biaxially stretched thermoplastic film containing 0% to 40% by weight of a fine white inorganic powder, as a core layer (A), and uniaxially stretched thermoplastic films containing 8% to 65% by weight of a fine white inorganic powder, said films provided on both sides of said core layer (A) as surface and back layers B and B', respectively.

19. The laminate according to claim 18, wherein said stretched microporous resin film base layer has a void volume of from 10% to 60%, wherein the void volume is specified by the following equation:

$$\text{Void volume }(\%) = (\rho_0 - \rho)/\rho_0 \times 100$$

wherein
$\rho_0$ is the density of the unstretched resin film, and
$\rho$ is the density of a stretched resin film.

20. The laminate according to claim 16, wherein the laminate has a total thickness of 80 μm to 350 μm, and the stretched microporous resin film base layer has a thickness of 30 μm to 300 μm, the gas barrier resin film layer has a thickness of 6 μm to 40 μm, the inorganic oxide thin film layer has a thickness of 5 nm to 600 nm, and the heat sealable resin layer has a thickness of 1 μm to 50 μm.

21. The laminate according to claim 16, wherein the inorganic oxide thin film layer is a silicon oxide thin film layer.

22. The laminate according to claim 16, wherein the inorganic oxide thin film layer is an amorphous aluminum oxide thin film layer.

23. A method of making the laminate according to claim 16, comprising:

providing the print on the surface side of the base layer;

providing the inorganic oxide thin film layer on the back side of the base layer;

providing the gas barrier resin film layer on the inorganic oxide thin film layer; and providing the heat sealable adhesive resin layer on the side opposite to the printed face of the base layer.

24. A method of making a packaged article, comprising packaging an article in a packaging material comprising the laminate according to claim 16.

25. The packaged article obtained according to the method of claim 24.

26. A composition, comprising an article packaged in a packaging material, wherein the packaging material comprises the laminate of claim 16.

* * * * *